US012553492B2

(12) United States Patent
Yasui

(10) Patent No.: US 12,553,492 B2
(45) Date of Patent: Feb. 17, 2026

(54) SHOCK ABSORBER

(71) Applicant: KYB CORPORATION, Tokyo (JP)

(72) Inventor: Takeshi Yasui, Tokyo (JP)

(73) Assignee: KYB Corporation, Tokyo (JP)

( * ) Notice: Subject to any disclaimer, the term of this patent is extended or adjusted under 35 U.S.C. 154(b) by 537 days.

(21) Appl. No.: 17/923,423

(22) PCT Filed: May 6, 2021

(86) PCT No.: PCT/JP2021/017341
§ 371 (c)(1),
(2) Date: Nov. 4, 2022

(87) PCT Pub. No.: WO2022/009510
PCT Pub. Date: Jan. 13, 2022

(65) Prior Publication Data
US 2023/0193973 A1    Jun. 22, 2023

(30) Foreign Application Priority Data

Jul. 6, 2020 (JP) ................................. 2020-116053

(51) Int. Cl.
*F16F 9/512* (2006.01)
*F16F 9/19* (2006.01)
(Continued)

(52) U.S. Cl.
CPC ............. *F16F 9/5126* (2013.01); *F16F 9/19* (2013.01); *F16F 9/348* (2013.01); *B60G 13/08* (2013.01);
(Continued)

(58) Field of Classification Search
CPC .... F16F 9/065; F16F 9/19; F16F 9/348; F16F 9/5126; F16F 2222/12; F16F 2228/066;
(Continued)

(56) References Cited

U.S. PATENT DOCUMENTS 4,834,222 A * 5/1989 Kato ...................... F16F 9/3484
188/322.22
5,207,300 A * 5/1993 Engel ...................... B60G 17/08
188/266.2
(Continued)

FOREIGN PATENT DOCUMENTS

JP    2008-232316 A    10/2008
JP    2010107003 A *    5/2010    .............. F16F 9/348
(Continued)

OTHER PUBLICATIONS

Nov. 7, 2023, Japanese Office Action issued for related JP Application No. 2020-116053.

(Continued)

*Primary Examiner* — Christopher P Schwartz
(74) *Attorney, Agent, or Firm* — Paratus Law Group, PLLC

(57) ABSTRACT

A shock absorber includes: a shock absorber main body that has an outer tube and a rod movably inserted into the outer tube and can extend and contract; a main passage and a sub passage that communicate in parallel two working chambers provided in the shock absorber main body; a main damping force generation element provided in the main passage; and a sub damping force generation element provided in the sub passage. The main damping force generation element has only a main valve that opens and closes the main passage. The sub damping force generation element has an orifice provided in series with the sub passage, and a sub valve that opens and closes the sub passage and has a valve opening pressure lower than that of the main valve.

6 Claims, 7 Drawing Sheets

(51) Int. Cl.
  *F16F 9/348* (2006.01)
  *B60G 13/08* (2006.01)
  *B60G 17/08* (2006.01)
  *F16F 9/06* (2006.01)

(52) U.S. Cl.
  CPC .......... *B60G 17/08* (2013.01); *B60G 2202/24* (2013.01); *B60G 2204/62* (2013.01); *B60G 2206/41* (2013.01); *B60G 2500/11* (2013.01); *B60G 2800/162* (2013.01); *F16F 9/065* (2013.01); *F16F 2222/12* (2013.01); *F16F 2228/066* (2013.01); *F16F 2232/08* (2013.01); *F16F 2234/02* (2013.01)

(58) Field of Classification Search
  CPC .. F16F 2232/08; F16F 2234/02; B60G 17/08; B60G 2202/24; B60G 2204/62; B60G 2206/41; B60G 2500/11; B60G 2800/162
  USPC .......... 188/266.2–266.5, 282.5, 282.6, 282.8
  See application file for complete search history.

(56) References Cited

U.S. PATENT DOCUMENTS

| | | | | |
|---|---|---|---|---|
| 2009/0026029 | A1* | 1/2009 | Ota | F16F 9/3485 |
| | | | | 188/266.5 |
| 2009/0294232 | A1* | 12/2009 | Ashiba | F16F 9/348 |
| | | | | 188/322.15 |
| 2012/0160620 | A1* | 6/2012 | Yamashita | B60G 13/08 |
| | | | | 188/266.5 |
| 2015/0210136 | A1* | 7/2015 | Teraoka | F16F 9/3487 |
| | | | | 188/282.1 |
| 2018/0080520 | A1 | 3/2018 | Tsuji | |
| 2018/0128341 | A1* | 5/2018 | Mizuno | F16F 9/19 |

FOREIGN PATENT DOCUMENTS

| | | |
|---|---|---|
| JP | 2017-002989 A | 1/2017 |
| JP | 2018-179091 A | 11/2018 |
| JP | 2019-183921 A | 10/2019 |

OTHER PUBLICATIONS

Jul. 6, 2021, International Search Report issued for related PCT Application No. PCT/JP2021/017341.
Jul. 6, 2021, International Search Opinion issued for related PCT Application No. PCT/JP2021/017341.
Jun. 27, 2025, Chinese Office Action issued for related CN Application No. 202180042267.5.

* cited by examiner

SHOCK ABSORBER

CROSS REFERENCE TO PRIOR APPLICATION

This application is a National Stage Patent Application of PCT International Patent Application No. PCT/JP2021/017341 (filed on May 6, 2021) under 35 U.S.C. § 371, which claims priority to Japanese Patent Application No. 2020-116053 (filed on Jul. 6, 2020), which are all hereby incorporated by reference in their entirety.

TECHNICAL FIELD

The present invention relates to a shock absorber.

BACKGROUND ART

A shock absorber is interposed, for example, between a vehicle body and a wheel of a vehicle, and is used to suppress vibrations of the vehicle body by generating damping force with resistance given to a flow of a liquid generated when the shock absorber extends and contracts.

Such a shock absorber is improved every day in order to realize a damping force characteristic that can further improve ride quality in a vehicle. A shock absorber as described below may be desired, in which: when the extension/contraction speed of the shock absorber is in a very low speed range, a damping force is rapidly increased with respect to the extension/contraction speed; in a low speed range, a damping coefficient is lowered such that the damping force does not become excessive; and in a high speed range, the damping coefficient is further lowered by one step and the damping force proportional to the extension/contraction speed is exerted, whereby a damping force characteristic (see the solid line in FIG. 7) is realized in which: in the very low speed range, the vibration of a vehicle can be effectively dampened; and in the other speed ranges, ride quality in the vehicle can be improved.

The shock absorber that realizes such a damping force characteristic is configured, for example, as follows. Specifically, the shock absorber includes, as disclosed in JP 2019-183921 A: a cylinder; a piston rod movably inserted into the cylinder; a piston that is attached to an outer circumference of a tip of the piston rod and partitions the inside of the cylinder into an extension side chamber and a compression side chamber; a sub valve case laminated on the piston and attached to the piston rod; an extension side leaf valve and a compression side leaf valve that open and close a port having an annular shape, having an inner circumference fixed to the piston rod, and being provided in the piston; and a sub valve that faces an annular valve seat having an annular shape, having an inner circumference fixed to the piston rod, and having an outer circumference provided in the sub valve case with a gap. In the shock absorber configured as described above, the port provided in the piston and a sub port provided in the sub valve case form a passage that communicates the extension side chamber and the compression side chamber, and the sub valve and the leaf valves on the extension side and the compression side are disposed in series with the passage.

According to the above configuration, in a speed region where the extension/contraction speed (piston speed) of the shock absorber is low and the sub valve is not deflected, the gap formed between the outer circumference of the free end of the sub valve and the annular valve seat is kept narrow. However, when the piston speed of the shock absorber increases and the end portion on the free end side of the sub valve is deflected, the gap formed on the outer circumference of the free end becomes wide, and the damping coefficient of the shock absorber decreases when the piston speed increases, so that the damping force characteristic of the shock absorber becomes a characteristic dependent on the speed.

In addition, when the conventional shock absorber extends and contracts at a high speed, the leaf valves on the extension side and the compression side are deflected to largely open the port and give resistance to the flow of hydraulic oil. As a result, when the extension and contraction speed of the shock absorber is in the high speed range, the damping force is generated mainly by the leaf valves on the extension side and the compression side and a damping coefficient is lowered by one step from the damping coefficient in the low speed range.

CITATION LIST

Patent Literature

Patent Literature 1: JT 2019-183921 A

SUMMARY OF INVENTION

Technical Problem

In the conventional shock absorber, the end portion on the fixed end side of the sub valve is pressed by a spacer, and the sub valve is deflected in which the spacer and an edge on the free end side of an abutment portion, with which the sub valve comes into contact, serve as fulcrums. In addition, the sub valve is provided is series with the extension side leaf valve and the compression side leaf valve in the conventional shock absorber, as described above, and the entire flow rate of hydraulic oil passing through the extension side chamber and the compression side chamber passes through the sub valve. Therefore, the conventional shock absorber is provided with a valve stopper that regulates a deflection amount such that the sub valve is not deflected beyond its limit due to application of a large load to the sub valve.

Therefore, when the extension/contraction speed of the shock absorber is in the high speed range, the deflection of the sub valve is regulated by the valve stopper, so that the flow passage area of the sub valve becomes equal to or less than the flow passage areas of the leaf valves on the extension side and the compression side, which becomes a bottleneck. Then, in the damping force characteristic of the conventional shock absorber, a pressure loss due to the resistance of the sub valve is overridden to the damping force in the high speed range and the damping force becomes excessive, as illustrated by the broken line in FIG. 7. As a result, the ride quality in the vehicle is impaired.

Therefore, an object of the present invention is to provide a shock absorber capable of improving ride quality in a vehicle without being affected by an override by a sub valve.

Solution to Problem

A shock absorber that solves the above problem includes: a shock absorber main body that has an outer tube and a rod movably inserted into the outer tube and can extend and contract; a main passage and a sub passage that communicate in parallel two working chambers provided in the shock absorber main body; a main damping force generation element provided in the main passage; and a sub damping force generation element provided in the sub passage, in which the main damping force generation element has only a man valve that opens and closes the main passage, and the sub damping force generation element has an orifice provided in series with the sub passage and a sub valve that opens and closes the sub passage and has a lower valve opening pressure than that of the main valve. In the shock absorber configured as described above, the sub passage provided with the sub valve and the main passage provided with the main valve communicate in parallel the two working chambers. As a result, the main valve is not affected by the flow passage area of the sub valve becoming a bottleneck.

In addition, the shock absorber may be configured by using a variable orifice as the orifice, and according to a shock absorber configured as described above, it is possible to adjust the damping force characteristic of the shock absorber and to adjust a timing at which the characteristic of the variable orifice appears the damping force characteristic.

In addition, the shock absorber may include a partition member that is inserted into the outer tube and defines two working chambers in the outer tube, in which the main passage is formed by a main port provided in the partition member and a leaf valve laminated on the partition member is used as the main valve. According to the shock absorber configured as described above, the main passage and the main valve can be integrated in the partition member, and since the leaf valve is used as the main valve, the total overall length of the partition member and the main valve assembled to the partition member can be easily shortened, and a stroke length can be easily secured.

In addition, the shock absorber may include a shaft member penetrating the partition member, and the sub passage may have a portion passing through the shaft member. In the shock absorber configured as described above, the sub passage can be easily installed.

Furthermore, the shock absorber may include a valve holder that is attached to the tip of the shaft member to fix the partition member to the shaft member and in which a part of the sub passage is formed, in which the sub valve is held by the valve holder. In the shock absorber configured as described above, not only the sub valve can be easily installed, but also the shock absorber can be assembled very simply.

In addition, the sub valve may include an annular valve body whose deflection is allowed in which one of the inner circumference or the outer circumference is fixed to serve as a fixed end and the other of the inner circumference or the outer circumference serves as a free end and that is provided in the sub passage, and an annular facing portion facing the annular valve body with an annular gap interposed between the annular facing portion and the free end of the annular valve body. According to the shock absorber configured as described above, the damping force can be exerted by narrowing the sub passage in the annular gap in a state where the annular valve body is not deflected, and the damping force characteristic can be easily adjusted by substituting an annular valve body having a different outer diameter.

Advantageous Effects of Invention

According to the shock absorber of the present invention, it is possible to improve the ride quality in a vehicle without being affected by an override by a sub valve.

DESCRIPTION OF EMBODIMENTS

Figure 1:
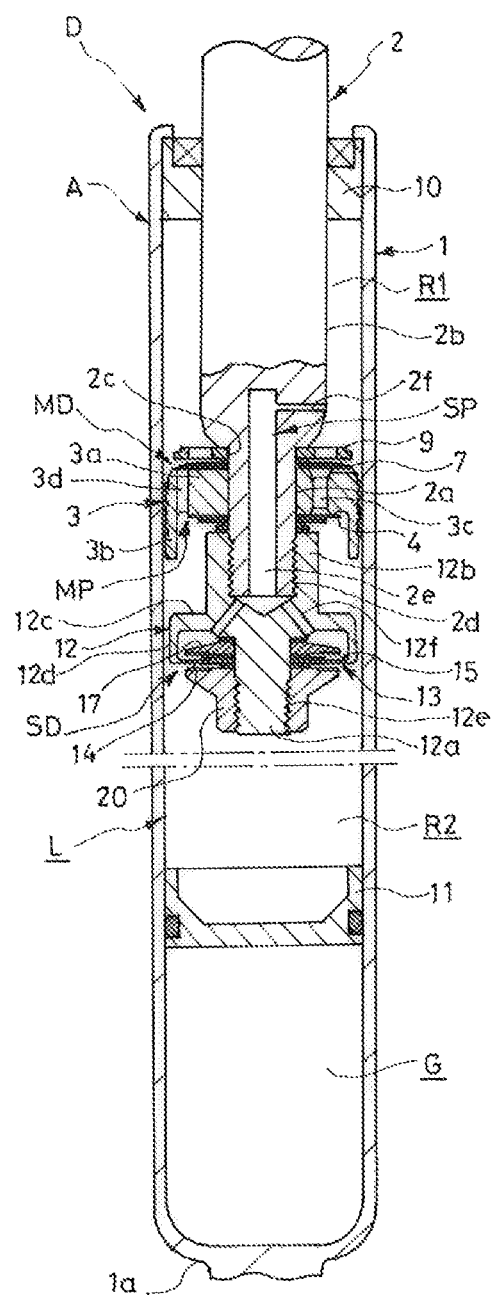
FIG. 1 is a longitudinal cross-sectional view of a shock absorber according to one embodiment of the present invention.
Figure 2:
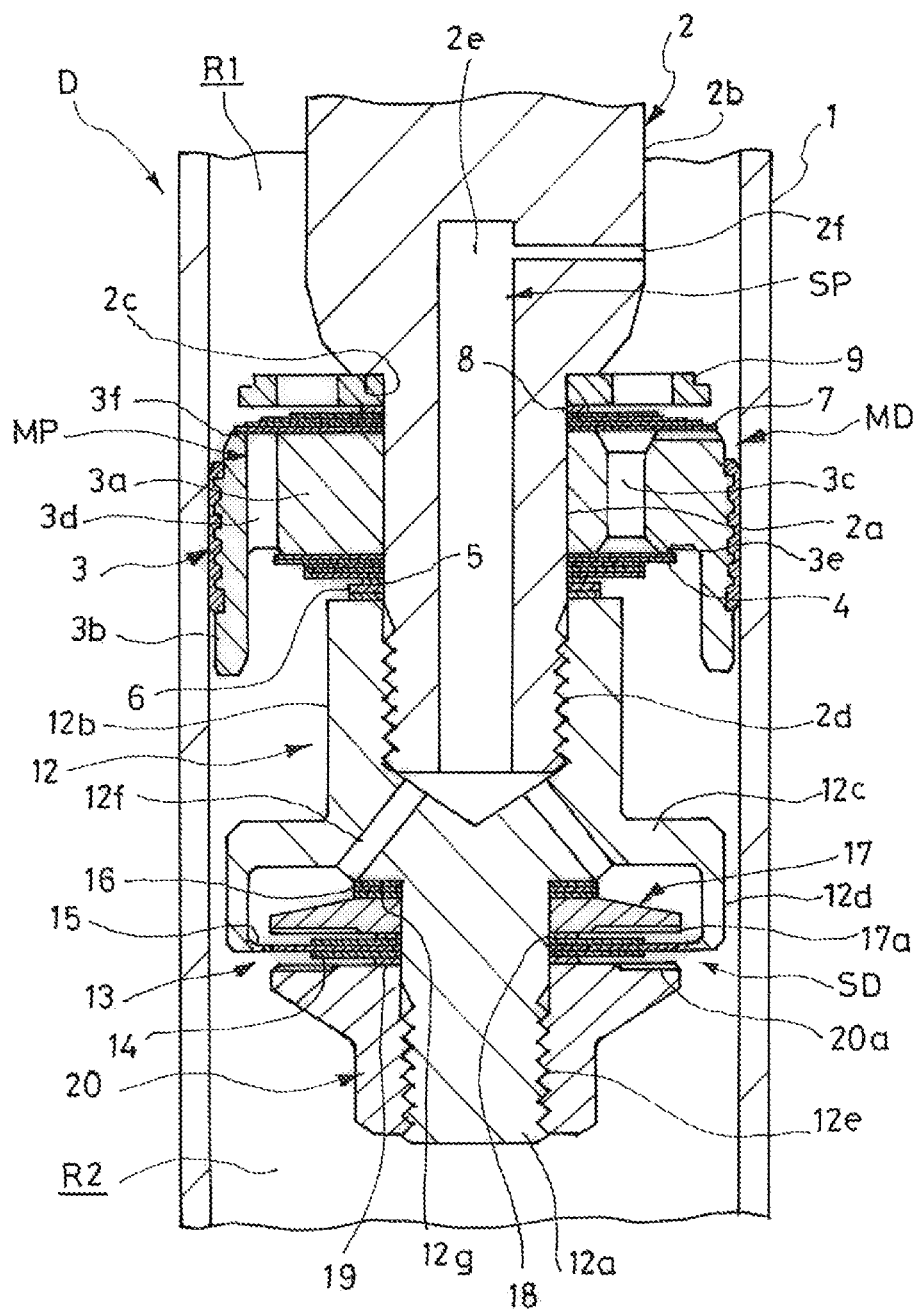
FIG. 2 is a partially enlarged cross-sectional view of the shock absorber according to the one embodiment of the present invention.

Hereinafter, the present invention will be described on the basis of an embodiment illustrated in the drawings. As illustrated in FIGS. 1 and 2, a shock absorber D according to one embodiment includes: a shock absorber main body A that has a cylinder 1 as an outer tube and a rod 2 movably inserted into the cylinder 1 and can extend and contract; a main passage MP and a sub passage SP that communicate in parallel an extension side chamber R1 and a compression side chamber R2 as two working chambers provided in the shock absorber main body A; a main damping force generation element MD provided in the main passage MP; and a sub damping force generation element SD provided in the sub passage SP. The shock absorber D is used by being interposed between a vehicle body and an axle in a non-illustrated vehicle in order to suppress vibrations of the vehicle body and a wheel.

Hereinafter, each portion of the shock absorber D will be described in detail. As illustrated in FIG. 1, the shock absorber main body A includes the bottomed tubular cylinder 1 as an outer tube, the rod 2 movably inserted into the cylinder 1, and a piston 3 as a partition member that is movably inserted into the cylinder 1 by being connected to the rod 2 and partitions the inside of the cylinder 1 into the extension side chamber R1 and the compression side chamber R2 as working chambers.

A bracket (not illustrated) is provided at a base end that is an upper end, in FIG. 1, of the rod 2, and the rod 2 is connected to one of the vehicle body and the axle via the non-illustrated bracket. A bracket (not illustrated) is also provided on a bottom portion 1a of the cylinder 1, and the cylinder 1 is connected to the other of the vehicle body and the axle via the non-illustrated bracket.

The shock absorber D is interposed between the vehicle body and the axle in this way. Then, when the vehicle travels on an uneven road surface or the like and the wheels vibrate up and down with respect to the vehicle body, the rod 2 enters and exits the cylinder 1, the shock absorber D extends and contracts, and the piston 3 moves up and down (in the axial direction) in the cylinder 1.

In addition, the shock absorber main body A includes an annular rod guide 10 that closes the upper end of the cylinder 1 and through the inner circumference of which the rod 2 is slidably inserted. Therefore, the inside of the cylinder 1 is a sealed space. A free piston 11 is slidably inserted on the opposite side to the rod 2 as viewed from the piston 3 in the cylinder 1.

On the upper side of the free piston 11 in the cylinder 1, a liquid chamber L is formed, and on the lower side, a gas chamber G is formed. Furthermore, the liquid chamber L is partitioned by the piston 3 into the extension side chamber R1 on the rod 2 side and the compression side chamber R2 on the piston 3 side, and the extension side chamber R1 and the compression side chamber R2 are filled with liquid such as hydraulic oil. On the other hand, the gas chamber G is filled with air or a gas such as nitrogen gas in a compressed state.

When the shock absorber D extends, the rod 2 exits the cylinder 1. When the inner volume of the cylinder increases by the volume of the rod 2 that has exited, the free piston 11 moves upward in the cylinder 1 to enlarge the gas chamber G. On the contrary, when the shock absorber D contracts, the rod 2 enters the cylinder 1. When the inner volume of the cylinder 1 decreases by the volume of the rod 2 that has entered, the free piston 11 moves downward in the cylinder 1 to reduce the gas chamber G.

Instead of the free piston 11, a bladder, a bellows, or the like may be used to partition the liquid chamber L and the gas chamber G, and the configuration of a movable partition as the partition can be changed as appropriate.

Furthermore, in the present embodiment, the shock absorber D is of a single rod or single tube type, and the gas chamber G is enlarged or reduced by the free piston (movable partition) 11 when the shock absorber D extends or contracts, thereby compensating for the volume of the rod 2 that enters and exits the cylinder 1. However, the configuration for the volume compensation can also be changed as appropriate.

For example, the free piston (movable partition) 11 and the gas chamber G are eliminated, and an outer shell is provided on the outer circumference of the cylinder 1 to form the shock absorber into a double tube type. Then, a reservoir chamber for storing liquid may be formed between the cylinder 1 and the outer shell, and volume compensation may be performed by the reservoir chamber. Furthermore, the reservoir chamber may be formed in a tank of a separate type from the cylinder 1. In addition, the shock absorber D may be configured as a double rod type shock absorber in which the piston 3 is attached to the center of the rod 2 and the end portions of the rod 2 protrude to the outside of the cylinder 1 from both ends of the cylinder 1.

The rod 2 includes a small-diameter portion 2a provided on the tip side, a step portion 2c provided at a boundary between the small-diameter portion 2a and a large-diameter portion 2b on the upper side, in FIG. 2, of the small-diameter portion 2a, a screw portion 2d provided on the outer circumference of the tip of the small-diameter portion 2a, a longitudinal hole 2e opened from the tip of the small-diameter portion 2a and extending in the axial direction, and an orifice 2f opened from the large-diameter portion 2b and leading to the longitudinal hole 2e.

Subsequently, the piston 3 as the partition member has an annular shape, is fitted to the outer circumference of the small-diameter portion 2a of the rod 2, and is fixed to the rod 2 by a valve holder 12 screwed to the screw portion 2d of the rod 2. In the present embodiment, the rod 2 is used as the shaft member, as described above. More specifically, the piston 3 includes: an annular main body 3a; a sliding contact cylinder 3b provided on the outer circumference of the main body 3a and in sliding contact with the inner circumference of the cylinder 1; an extension side main port 3c provided on the same circumference of the main body 3a and penetrating the main body 3a in the axial direction; a compression side main port 3d provided on the same circumference on the outer circumference side, from the extension side main port 3c, of the main body 3a and penetrating the main body 3a in the axial direction; an annular extension side valve seat 3e provided between the extension side main port 3c at the lower end, in FIG. 2, of the main body 3a and the compression side main port 3d and surrounding the extension side main port 3c; a petal-type compression side valve seat 3f provided at the upper end, in FIG. 2, of the main body 3a and individually surrounding only the opening of the compression side main port 3d by avoiding the extension side main port 3c. In the present embodiment, the extension side main port 3c and the compression side main port 3d that are provided in the piston 3 constitute the main passage MP that communicates the extension side chamber R1 and the compression side chamber R2. On the other hand, the inside of the rod 2 and the orifice 2f form a part of the sub passage SP that bypasses the main passage MP and communicates the extension side chamber R1 and the compression side chamber R2.

Returning to FIG. 2, on the lower surface of the piston 3, an extension side main valve 4 formed of a laminated leaf valve whose inner circumferential side is fixed to the small-diameter portion 2a of the rod 2; a spacer 5 that sets the position of the fulcrum of the deflection of the extension side main valve 4, has an annular shape, and has an outer diameter smaller than that of the extension side main valve 4; and an annular spacer 6 are stacked. On the upper surface, in FIG. 2, of the piston 3, a compression side main valve 7 formed of a laminated leaf valve whose inner circumferential side is fixed to the small-diameter portion 2a of the rod 2; a spacer 8 that sets the position of the fulcrum of the deflection of the compression side main valve 7, has an annular shape, and has an outer diameter smaller than that of the compression side main valve 7; and a valve stopper 9 are stacked.

The valve stopper 9, the spacer 8, the compression side main valve 7, the piston 3, the extension side main valve 4, the spacer 5, and the spacer 6 are sequentially assembled to the outer circumference of the small-diameter portion 2a of the rod 2, and then sandwiched between the valve holder 12 screwed to the screw portion 2d at the tip of the rod 2 and the step portion 2c of the rod 2, thereby being fixed to the rod 2.

The extension side main valve 4 is a laminated leaf valve formed by laminating a plurality of annular plates. The extension side main valve 4 has an inner circumference fixed to the rod 2 as described above, is laminated on the lower end, in FIG. 2, of the piston 3, and is seated on the extension side valve seat 3e of the piston 3. The extension side main valve 4 closes the extension side main port 3c surrounded by the extension side valve seat 3e in the state of being seated on the extension side valve seat 3e, but does not close the inlet of the compression side main port 3d. When the differential pressure between the pressure of the extension side chamber R1 acting on the front side via the extension side main port 3c and the pressure of the compression side chamber R2 acting on the back side reaches a valve opening pressure, the extension side main valve 4 deflects the outer circumference, separates from the extension side valve seat 3e, opens the extension side main port 3c, and gives resistance to the flow of the liquid passing through the extension side main port 3c. In the shock absorber D of the present embodiment, the extension side main valve 4 opens when the shock absorber D extends and the piston speed is in a medium-to-high speed range, and gives resistance to the flow of the liquid passing through the extension side main port 3c from the extension side chamber R1 to the compression side chamber R2. In the extension side main valve 4, the extension side main port 3c is set in a one-way passage that allows only the flow of the liquid flowing through the extension side main port 3c from the extension side chamber R1 to the compression side chamber R2.

In addition, the extension side valve seat 3e protrudes downward in FIG. 2 from the abutment surface of the main body 3a with which the inner circumference of the extension side main valve 4 comes into contact, and a difference in height (height difference) is provided between the heights of them. When the extension side main valve 4 is overlapped with the piston 3 and the inner circumferential side is fixed to the outer circumference of the rod 2, the outer circumference of the extension side main valve 4 is deflected by the height difference. As described above, the extension side main valve 4 is initially deflected in advance, and presses itself against the extension side valve seat 3e by the resilient force exerted by itself. Therefore, the extension side main valve 4 does not open until the force for deflecting the extension side main valve 4 due to the differential pressure between the extension side chamber R1 and the compression side chamber R2 overcomes the pressing force due to the resilient force described above, and the differential pressure at the time of opening is the valve opening pressure of the extension side main valve 4. Therefore, the valve opening pressure of the extension side main valve 4 can be adjusted by the deflection stiffness of the extension side main valve 4 and the initial deflection amount given to the extension side main valve 4.

The other compression side main valve 7 is a laminated leaf valve formed by laminating a plurality of annular plates. The compression side main valve 7 has an inner circumference fixed to the rod 2 as described above, is laminated on the upper end, in FIG. 2, of the piston 3, and is seated on the compression side valve seat 3f of the piston 3. The compression side main valve 7 closes only the compression side main port 3d surrounded by the compression side valve seat 3f in the state of being seated on the compression side valve seat 3f, but does not close the inlet of the extension side main port 3c. Then, when the differential pressure between the pressure of the compression side chamber R2 acting on the front side via the compression side main port 3d and the extension side chamber R1 acting on the back side reaches the valve opening pressure, the compression side main valve 7 deflects the outer circumference, separates from the compression side valve seat 3f, opens the compression side main port 3d, and gives resistance to the flow of the liquid passing through the compression side main port 3d. In the shock absorber D of the present embodiment, the compression side main valve 7 opens when the shock absorber D contracts and the piston speed is in the medium-to-high speed range, and gives resistance to the flow of the liquid passing through the compression side main port 3a from the compression side chamber R2 to the extension side chamber R1. In addition, the compression side main valve 7 is set in a one-way passage that allows only the flow of the liquid flowing through the compression side main port 3d from the compression side chamber R2 to the extension side chamber R1. Similarly to the extension side main valve 4, the valve opening pressure of the compression side main valve 7 can be adjusted by the deflection stiffness of the compression side main valve 7 and the initial deflection amount given to the compression side main valve 7.

As described above, the main damping force generation element MD of the present embodiment includes the extension side main valve 4 and the compression side main valve 7 provided in the extension side main port 3c and the compression side main port 3d. that constitute the main passage MP.

The extension side main valve 4 and the compression side main valve 7 are laminated leaf valves formed by laminating a plurality of annular plates. The number of the laminated annular plates can be arbitrarily changed depending on the damping force to be desirably generated in the shock absorber D, and may be a leaf valve formed of only one annular plate. In addition, the extension side main valve 4 and the compression side main valve 7 may be valves having a configuration other than the leaf valve or the laminated leaf valve. However, when a leaf valve or a laminated leaf valve using thin annular plates is used, it is possible to enjoy an advantage that the overall length of the piston portion of the shock absorber D is not increased and the stroke length of the shock absorber D is easily secured.

The inner circumferences of the extension side main valve 4 and the compression side main valve 7 are supported by the spacers 5 and 8, and deflections on the outer circumferential sides that are not supported by the spacers 5 and 8 are allowed. Therefore, the positions of the fulcrums of the deflections of the extension side main valve 4 and the compression side main valve 7 can be changed by setting the outer diameters of the spacers 5 and 8.

When the compression side main valve 7 is greatly deflected, the valve stopper 9 comes into contact with the outer circumference of the compression side main valve 7 to regulate further deflection of the compression side main valve 7, thereby protecting the compression side main valve 7.

The spacer 6 includes a plurality of annular washers, and adjusts the position of the valve holder 12 to be described later. When the thicknesses, in the axial direction, of the extension side main valve 4 and the compression side main valve 7 decrease due to the adjustments of the numbers of the annular plates of the extension side main valve 4 and the compression side main valve 7, it is only required to take measures to prevent a situation in which, in the valve holder 12, no axial force is applied to the valve stopper 9, the spacer 8, the compression side main valve 7, the piston 3, the extension side main valve 4, the spacer 5, and the spacer 6 by the adjustment of the number of the shims of the spacer 6.

The valve holder 12 includes: a holding shaft 12a that holds an annular valve body 14 of the sub valve 13 in the sub damping force generation element SD; a tubular nut portion 12b that is connected to the upper end, in FIG. 2, of the holding shaft 12a and is screwed to the screw portion 2d at the tip of the rod 2; a flange portion 12c provided on the outer circumference of the upper and, in FIG. 2, of the holding shaft 12a; and an annular portion 12d having an annular protrusion that hangs down from the outer circumference of the lower end, in FIG. 2, of the flange portion 12c and protrudes inward at the inner circumference of the lower end. The maximum outer diameter of the valve holder 12 is smaller than the inner diameter of the cylinder 1, and does not interfere with the communication between the extension side chamber R1 and the compression side chamber R2 by the main passage NP.

The valve holder 12 includes a screw portion 12e formed on the outer circumference of the lower end, in FIG. 2, of the holding shaft 12a, and a communication hole 12f that opens from the upper end of the holding shaft 12a, opens to the lower end of the Flange portion 12c, and communicates the inside of the nut portion 12b with the inside of the annular portion 12d.

An annular spacer 16, a valve stopper 17, a spacer 18, the annular valve body 14 of the sub valve 13, and a spacer 19 are sequentially assembled to the outer circumference of the holding shaft 12a. The annular spacer 16, the valve stopper 17, the spacer 18, the annular valve body 14 of the sub valve 13, and the spacer 19 are fixed in the state of being sandwiched between a nut 20 screwed to the screw portion 12e of the holding shaft 12a and an inner circumferential seat portion 12g formed at the root of the flange portion 12c.

When the valve holder 12 is attached to the screw portion 2d of the rod 2 in this way, the communication hole 12f is communicated with the extension side chamber R1 through the inside of the rod 2 and the orifice 2f provided in the rod 2. The communication hole 12f is communicated with the compression side chamber R2 through the inner circumference of the annular portion 12d. In the shock absorber D of the present embodiment, the orifice 2f, the inside of the rod 2, the communication hole 12f, and the space inside the annular portion 12d form the sub passage SP that bypasses the main passage MP and communicates the extension side chamber R1 and the compression side chamber R2, as described above. As described above, the main passage MP and the sub passage SP communicate in parallel the extension side chamber R1 and the compression side chamber R2.

The sub valve 13 includes the annular valve body 14 whose inner circumference is fixed to the outer circumference of the holding shaft 12a of the valve holder 12, and an annular facing portion 15 formed of an annular protrusion provided, along the circumferential direction, on the inner circumference of the annular portion 12d of the valve holder 12. Therefore, the sub valve 13 is provided in the sub passage SP so as to be in series with the orifice 2f, and the sub valve 13 and the orifice 2f constitute the sub damping force generation element SD. The orifice 2f is provided only in the sub passage SP, and is not provided in the main passage MP. Since the orifice 2f is only required to be provided in series with the sub valve 13 with respect to the sub passage SP, the installation place is not limited to the rod 2. The orifice 2f may be provided, for example, in the valve holder 12, in which the communication hole 12f of the valve holder 12 is used as an orifice.

Figure 3:
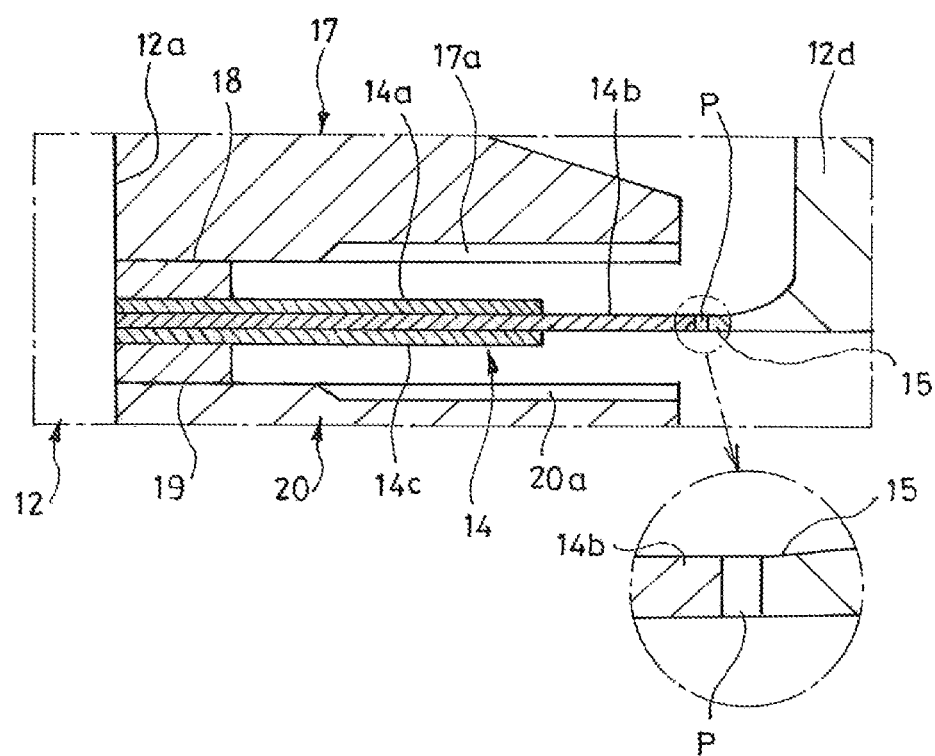
FIG. 3 is an enlarged cross-sectional view of the shock absorber according to the one embodiment of the present invention.

As illustrated in FIG. 3, the annular valve body 14 includes three laminated leaf valves 14a, 14b, and 14c, and can be elastically deformed. The outer diameter of the central leaf valve 14b of the three leaf valves constituting the annular valve body 14 is larger than the outer diameters of the leaf valves 14a and 14c located at both upper and lower ends. The number of the leaf valves constituting the annular valve body 14 can be arbitrarily set depending on the damping force to be desirably obtained in the shock absorber D, and may be singular rather than plural.

The annular valve body 14 is positioned at a position where the outer circumferential surface of the central leaf valve 14b faces the inner circumferential surface of the annular facing portion 15 provided in the valve holder 12, and is fixed to the holding shaft 12a. The spacers 18 and 19 are respectively interposed between the leaf valve 14a at the upper end and the valve stopper 17 immediately above the leaf valve, and between the leaf valve 14c at the lower end and the nut 20 immediately below the leaf valve. The spacer 16 is formed of a plurality of annular plates, and the leaf valve 14b of the annular valve body 14 is positioned so as to just face the inner circumferential surface of the annular facing portion 15 by adjusting the number of the laminated annular plates in the spacer 16.

Each of these spacers 18 and 19 is an annular plate having an outer diameter smaller than the outer diameter of each of the leaf valves 14a, 14b, and 14c constituting the annular valve body 14. The annular valve body 14 is fixed to the holding shaft 12a of the valve holder 12 in a state where the inner circumferential portion thereof is sandwiched between the spacers 18 and 19. On the other hand, the outer circumferential side, from the spacers 18 and 19, of the annular valve body 14 can be deflected and displaced upward and downward in FIG. 3, in which the outer circumferential edge of the abutment portion between the spacers 18 and 19 and the annular valve body 14 serves as a fulcrum.

In the present embodiment, the inner circumference of the annular valve body 14 attached to the valve holder 12 serves as a fixed end that does not move with respect to the holding shaft 12a of the valve holder 12, and the outer circumferential surface of the central leaf valve 14b located on the outer circumferential side of the annular valve body 14 serves as a free end that can move in the vertical direction with respect to the annular facing portion 15 provided in the valve holder 12, as described above.

The annular portion 12d of the valve holder 12 is provided with the annular facing portion 15 formed of the annular protrusion protruding radially inward from the entire inner circumference of the annular portion 12d, and the annular valve body 14 is disposed on the inner circumference side of the annular facing portion 15. Then, in an extremely low speed range where the piston speed is close to 0 (zero), such as when the shock absorber D starts to work, the annular valve body 14 is not deflected and is kept in the initial state of installation illustrated in FIG. 3.

In a state where the annular valve body 14 is not deflected as described above, the leaf valve 14b of the annular valve body 14 faces the annular facing portion 15 with the outer circumferential surface just facing the inner circumferential surface of the annular facing portion 15 and with a predetermined annular gap P interposed therebetween, as illustrated in FIG. 3. In the present embodiment, the annular gap P formed between the leaf valve 14b and the annular facing portion 15 just facing each other is very narrow, and the opening area of the annular gap P is smaller than the opening area of the orifice 2f described above.

On the other hand, when the shock absorber D extends and the piston speed is in the low speed range or the medium-to-high speed range, the outer circumferential portion of the annular valve body 14 is deflected downward from the deflection fulcrum. On the other hand, when the shock absorber D contracts and the piston speed is in the low speed range or the medium-to-high speed range, the outer circumferential portion of the annular valve body 14 is deflected upward from the deflection fulcrum. When the annular valve body 14 is deflected, separates from the annular facing portion 15, and opens, the differential pressure between the extension side chamber R1 and the compression side chamber R2, that is, the valve opening pressure of the sub valve 13 is lower than the valve opening pressures of the extension side main valve 4 and the compression side main valve 7. When the piston speed is in the low speed range, the sub valve 13 opens as described above, but the extension side main valve 4 and the compression side main valve 7 do not open, and the liquid passes only through the sub passage SP.

As described above, in the low speed range and the high speed range where the outer circumferential portion of the annular valve body 14 is deflected vertically, the opening area of the annular gap formed between the leaf valve 14b of the annular valve body 14 shifted vertically and the annular facing portion 15 is larger than the opening area of the orifice 2f.

In addition, when the flow rate of the liquid flowing through the sub passage SP increases and the annular valve body 14 is greatly deflected, the valve stopper 17 located on the upper side of the annular valve body 14 comes into contact with the upper end surface, in FIG. 3, of the leaf valve 14*b*, and regulates further upward deflection, in FIG. 3, of the annular valve body 14, thereby protecting the annular valve body 14. In addition, the valve stopper 17 includes a notch 17*a* formed from the outer circumference of the lower surface, in FIG. 3, facing the annular valve body 14 to the inner circumferential side. Even when the leaf valve 14*b* comes into contact with the valve stopper 17, the notch 17*a* causes the gap defined by the annular valve body 14 and the valve stopper 17 to communicate outward, thereby preventing the gap from becoming a closed space. With this notch 17*a* provided, the leaf valve 14*b* can be prevented from being adsorbed to the valve stopper 17 if the leaf valve 14*b* comes into contact with the valve stopper 17. Therefore, when the sub valve 13 works to the valve closing side after opening to the maximum, a closing delay of the sub passage SP by the sub valve 13 can be prevented.

Furthermore, when the flow rate of the liquid flowing through the sub passage SP increases and the annular valve body 14 is greatly deflected, the nut 20 located on the lower side of the annular valve body 14 comes into contact with the lower end surface, in FIG. 3, of the leaf valve 14*b*, and regulates further upward deflection, in FIG. 3, of the annular valve body 14, thereby protecting the annular valve body 14. Therefore, the nut 20 serves the role of fixing the annular valve body 14, the spacer 16, the valve stopper 17, and the spacers 18 and 19 to the valve holder 12, and also functions as a valve stopper that regulates downward deflection, in FIG. 3, of the annular valve body 14.

In addition, the nut 20 includes a notch 20*a* formed from the outer circumference of the upper surface, FIG. 3, facing the annular valve body 14 to the inner circumferential side. Even if the leaf valve 14*b* comes into contact with the nut 20, the notch 20*a* causes the gap defined by the annular valve body 14 and the nut 20 to communicate outward, thereby preventing the gap from becoming a closed space. With this notch 20*a* provided, the leaf valve 14*b* can be prevented from being adsorbed to the nut 20 if the leaf valve 14*b* comes into contact with the nut 20. Therefore, when the sub valve 13 works to the valve closing side after opening to the maximum, a closing delay of the sub passage SP by the sub valve 13 can be prevented.

Hereinafter, the working of the shock absorber D according to the present embodiment will be described. When the shock absorber D extends, the piston 3 moves upward in the cylinder 1 to compress the extension side chamber R1. When the extension speed of the shock absorber D is in the very low speed range, the pressure of the extension side chamber R1 increases but the pressure difference with the pressure of the compression side chamber R2 does not reach the valve opening pressure of the extension side main valve 4. As a result, the extension side main valve 4 does not open, and the extension side main port 3*c* is kept closed. The compression side main valve 7 receives the pressure of the extension side chamber R1 from the back side, and closes the compression side main port 3*d*. When the extension speed of the shock absorber D is in the very low speed range, the pressure of the extension side chamber R1 increases but the differential pressure with the pressure of the compression side chamber. R2 does not reach the valve opening pressure of the sub valve 13. As a result, the sub valve 13 is in a valve closed state, but the annular gap P is formed between the annular valve body 14 and the annular facing portion 15.

Figure 4:
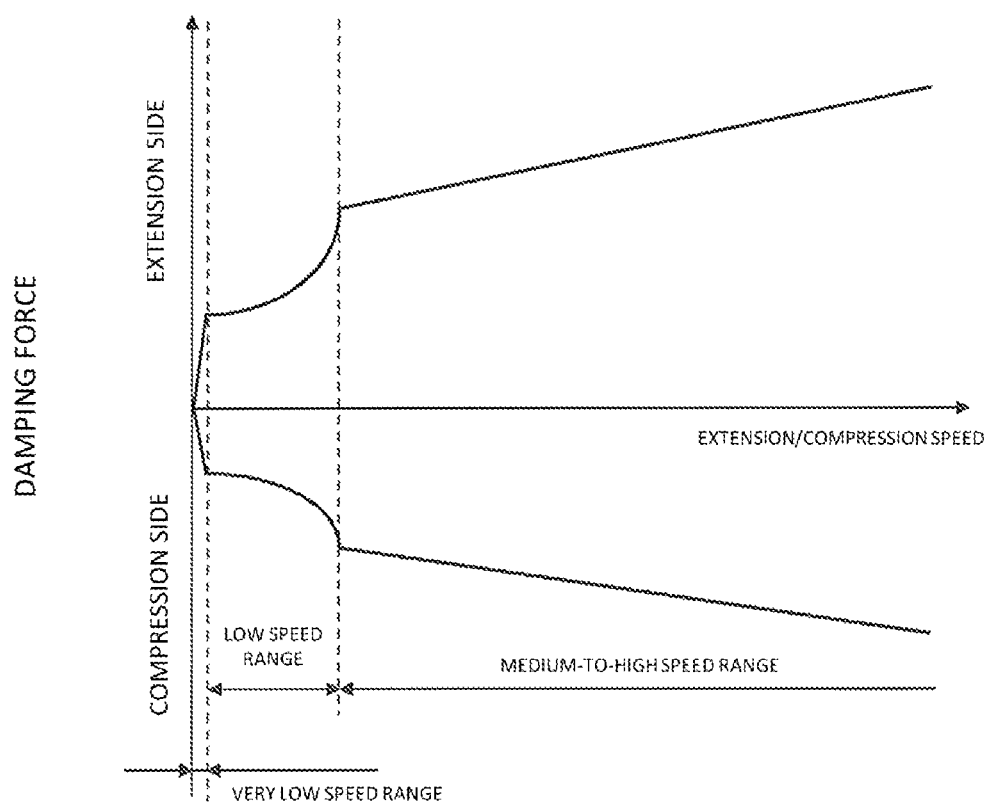
FIG. 4 is a graph showing a damping force characteristic of the shock absorber according to the one embodiment of the present invention.

Therefore, the liquid cannot pass through the main passage MP that is blocked, but the liquid moves from the extension side chamber R1 to the compression side chamber R2 via the sub passage SP. When passing through the sub passage SP, the liquid passes through the orifice 2*f* and the annular gap P, but the flow passage area of the annular gap P in the sub valve 13 in a valve closed state is smaller than the flow passage area of the orifice 2*f*. Therefore, when the extension speed of the shock absorber D is in the very low speed range, the shock absorber D generates a damping force that interferes with the extension mainly by the resistance given to the liquid by the sub valve 13. Therefore, when the extension speed of the shook absorber D is in the very low speed range, the damping force characteristic on the extension side of the shock absorber D (characteristic of the damping force with respect to the extension speed of the shock absorber D) is a characteristic in which the damping coefficient is very large and the damping force greatly rises with respect to an increase in the piston speed, as illustrated in FIG. 4.

When the extension speed of the shock absorber D is in the low speed range beyond the very low speed range, the pressure of the extension side chamber R1 increases, but the differential pressure with the pressure of the compression side chamber R2 does not reach the valve opening pressure of the extension side main valve 4. As a result, the extension side main valve 4 is yet to open, and the extension side main port 3*c* is kept closed. The compression side main valve 7 receives the pressure of the extension side chamber R1 from the back side, and closes the compression side main port 3*d*. When the extension speed of the shock absorber D is in the low speed range, the differential pressure between the pressure of the extension side chamber R1 and the pressure of the compression side chamber R2 exceeds the valve opening pressure of the sub valve 13. As a result, the annular valve body 14 is deflected and the sub valve 13 opens, which increases the flow passage area of the annular gap P between the annular valve body 14 and the annular facing portion 15. Therefore, the liquid cannot pass through the main passage MP that is blocked, but the liquid moves from the extension side chamber R1 to the compression side chamber R2 via the sub passage SP. When passing through the sub passage SP, the liquid passes through the orifice 2*f* and the annular gap P, but the flow passage area of the annular gap P in the sub valve 13 in a valve opened state is larger than the flow passage area of the orifice 2*f*. Therefore, when the extension speed of the shock absorber D is in the low speed range, the shock absorber D generates a damping force that interferes with the extension mainly by the resistance given to the liquid by the orifice 2*f*. Therefore, when the extension speed of the shock absorber D is in the very low speed range, the damping force characteristic on the extension side of the shock absorber P is proportional to the square of the extension speed of the shock absorber D as illustrated in FIG. 4, which is specific to an orifice. In the characteristic, the slope is flatter than when the extension speed is in the very low speed range.

Furthermore, when the extension speed of the shock absorber D is in the medium-to-high speed range beyond the low speed range, the differential pressure between the pressure of the extension side chamber R1 and the pressure of the compression side chamber R2 reaches the valve opening pressure of the extension side main valve 4. As a result, the extension side main valve 4 is deflected and opens, which opens the extension side main port 3*c*. The compression side main valve 7 receives the pressure of the extension side chamber R1 from the back side, and closes the compression side main port 3*d*. When the extension speed of the shock absorber D is in the medium-to-high speed range, the differential pressure between the pressure of the extension side chamber R1 and the pressure of the compression side chamber R2 exceeds the valve opening pressure of the sup valve 13. As a result, the sub valve 13 opens, which increases the flow passage area of the annular gap P between the annular valve body 14 and the annular facing portion 15. The liquid can pass through the sub passage SP, but the main passage MP is also opened. As a result, the liquid moves from the extension side chamber R1 to the compression side chamber R2 through the sub passage SP and the main passage MP. When the extension speed of the shock absorber D is in the medium-to-high speed range, the flow rate of the liquid moving from the extension side chamber R1 to the compression side chamber R2 increases. Since the resistance received by the liquid when passing through the orifice 2f and the sub valve 13 in the sub passage SP is larger than the resistance received by the liquid when passing through the extension side main valve 4, the liquid becomes difficult to pass through the sub passage SP. As a result, most of the liquid moving from the extension side chamber R1 to the compression side chamber R2 passes through the main passage MP. Therefore, when the extension speed of the shock absorber D is in the medium-to-high speed range, the shock absorber D generates a damping force that interferes with the extension mainly by the resistance given to the liquid by the extension side main valve 4. Therefore, when the extension speed of the shock absorber D is in the medium-to-high speed range, the damping force characteristic on the extension side of the shock absorber D is proportional to the extension speed of the shock absorber D as illustrated in FIG. 4, which is specific to the extension side main valve 4. In the characteristic, the damping coefficient is smaller than that when the extension speed is in the low speed range.

Subsequently, when the shock absorber D contracts, the piston 3 moves downward in the cylinder 1 to compress the compression side chamber R2. When the contraction speed of the shock absorber D is in the very low speed range, the pressure of the compression side chamber R2 increases, but the pressure difference with the pressure of the extension side chamber R1 does not reach the valve opening pressure of the compression side main valve 7. As a result, the compression side main valve 7 does not open, and the compression side main port 3d is kept closed. The extension side main valve 4 receives the pressure of the compression side chamber R2 from the back side, and closes the extension side main port 3c. When the contraction speed of the shock absorber D is in the very low speed range, the pressure of the compression side chamber R2 increases, but the differential pressure with the pressure of the extension side chamber R1 does not reach the valve opening pressure of the sub valve 13. As a result, the sub valve 13 is in a valve closed state, but the annular gap P is formed between the annular valve body 14 and the annular facing portion 15. Therefore, the liquid cannot pass through the main passage MP that is blocked, but the liquid moves from the compression side chamber R2 to the extension side chamber R1 via the sub passage SP. When passing through the sub passage SP, the liquid passes through the orifice 2f and the annular gap P, but the flow passage area of the annular gap P in the sub valve 13 in a valve closed state is smaller than the flow passage area of the orifice 2f. Therefore, when the contraction speed of the shock absorber D is in the very low speed range, the shock absorber D generates a damping force that interferes with the contraction mainly by the resistance given to the liquid by the sub valve 13. Therefore, when the contraction speed of the shock absorber D is in the very low speed range, the damping force characteristic on the compression side of the shock absorber D is a characteristic in which the damping coefficient is very large and the damping force greatly rises with respect to an increase in the piston speed, as illustrated in FIG. 4.

When the contraction speed of the shock absorber D is in the low speed range beyond the very low speed range, the pressure of the compression side chamber R2 increases, but the differential pressure with the pressure of the extension side chamber R1 does not reach the valve opening pressure of the compression side main valve 7. As a result, the compression side main valve 7 is yet to open, and the compression side main port 3d is kept closed. The extension side main valve 4 receives the pressure of the compression side chamber R2 from the back side, and closes the extension side main port 3c. When the contraction speed of the shock absorber D is in the low speed range, the differential pressure between the pressure of the compression side chamber R2 and the pressure of the extension side chamber R1 exceeds the valve opening pressure of the sub valve 13. As a result, the annular valve body 14 is deflected and the sub valve 13 opens, which increases the flow passage area of the annular gap P between the annular valve body 14 and the annular facing portion 15. Therefore, the liquid cannot pass through the main passage MP that is blocked, but the liquid moves from the compression side chamber R2 to the extension side chamber R1 via the sub passage SP. When passing through the sub passage SP, the liquid passes through the orifice 2f and the annular gap P, but the flow passage area of the annular gap P in the sub valve 13 in a valve opened state is larger than the flow passage area of the orifice 2f. Therefore, when the contraction speed of the shock absorber D is in the low speed range, the shock absorber D generates a damping force that interferes with the contraction mainly by the resistance given to the liquid by the orifice 2f. Therefore, when the contraction speed of the shock absorber D is in the low speed range, the damping force characteristic on the compression side of the shock absorber D is proportional to the square of the contraction speed of the shock absorber D as illustrated in FIG. 4, which is specific to an orifice. In the characteristic, the slope is flatter than when the contraction speed is in the very low speed range.

Furthermore, when the contraction speed of the shock absorber D is in the medium-to-high speed range beyond the low speed range, the differential pressure between the pressure of the compression side chamber R2 and the pressure of the extension side chamber R1 reaches the valve opening pressure of the compression side main valve 7. As a result, the compression side main valve 7 is deflected and opens, which opens the compression side main port 3d. The extension side main valve 4 receives the pressure of the compression side chamber R2 from the back side, and closes the extension side main port 3c. When the contraction speed of the shock absorber D is in the medium-to-high speed range, the differential pressure between the pressure of the compression side chamber R2 and the pressure of the extension side chamber R1 exceeds the valve opening pressure of the sub valve 13. As a result, the sub valve 13 opens, which increases the flow passage area of the annular gap P between the annular valve body 14 and the annular facing portion 15. The liquid can pass through the sub passage SP, but the main passage MP is also opened. As a result, the liquid moves from the compression side chamber R2 to the extension side chamber R1 through the sub passage SP and the main passage MP. When the contraction speed of the shock absorber D is in the medium-to-high speed range, the flow rate of the liquid moving from the compression side chamber R2 to the extension side chamber R1 increases. Since the resistance received by the liquid when passing through the orifice 2$f$ and the sub valve 13 in the sub passage SP is larger than the resistance received by the liquid when passing through the compression side main valve 7, the liquid becomes difficult to pass through the sub passage SP. As a result, most of the liquid moving from the compression side chamber R2 to the extension side chamber R1 passes through the main passage MP. Therefore, when the contraction speed of the shock absorber D is in the medium-to-high speed range, the shock absorber D generates a damping force that interferes with the contraction mainly by the resistance given to the liquid by the compression side main valve 7. Therefore, when the contraction speed of the shock absorber D is in the medium-to-high speed range, the damping force characteristic on the compression side of the shock absorber D is proportional to the contraction speed of the shock absorber D as illustrated in FIG. 4, which is specific to the compression side main valve 7. In the characteristic, the damping coefficient is smaller than that when the contraction speed is in the low speed range.

Here, the shock absorber D of the present embodiment includes the main passage MP and the sub passage SP that communicate in parallel the extension side chamber R1 and the compression side chamber R2, the main damping force generation element MD in the main passage MP, and the sub damping force generation element SD provided in the sub passage SP. The main damping force generation element MD includes only the extension side main valve 4 and the compression side main valve 7 as the main valve that opens and closes the main passage MP. The sub damping force generation element SD includes the orifice 2$f$ provided in series with the sub passage SP, and the sub valve 13 that opens and closes the sub passage SP and the valve opening pressure of which is lower than those of the extension side main valve 4 and the compression side main valve 7 as the main valve. In the shock absorber D configured as described above, the sub passage SP provided with the orifice 2$f$ and the sub valve 13 and the main passage MP only including, as the main valve, the extension side main valve 4 and the compression side main valve 7 communicate in parallel the extension side chamber R1 and the compression side chamber R2. As a result, even if the deflection of the sub valve 13 is regulated by the valve stopper 17 or the nut 20, the flow of the liquid passing through the main passage MP is not affected. That is, in the shock absorber D of the present embodiment, the sub valve 13 does not become a bottleneck that limits the flow passage area to the minimum. Therefore, even when the expansion/contraction speed of the shock absorber D reaches the high speed range, most of the liquid in the extension side chamber R1 or the compression side chamber R2 compressed by the piston 3 flows through the main passage MP. As a result, it is possible to suppress an override in which the damping force becomes excessive due to addition of a pressure loss by the sub valve 13 to a pressure loss in the expansion side main valve (main valve) 4 or the compression side main valve (main valve) 7.

In the shock absorber D of the present embodiment, a speed range in which the damping force is generated mainly by the sub valve 13 is set to the very low speed range, a speed range in which the damping force is generated mainly by the orifice 2$f$ is set to the low speed range, and a speed range in which the damping force is generated mainly by the extension side main valve 4 and the compression side main valve 7 is set to the medium-to-high speed range, as described above. Note that a designer can arbitrarily set the speeds at which the very low speed, the low speed, and the medium-to-high speed are classified.

As described above, the shock absorber D includes: the shock absorber main body A that has the cylinder (outer tube) 1 and the rod 2 movably inserted into the cylinder (outer tube) 1 and can extend and contract; the main passage MP and the sub passage SP that communicate in parallel the extension side chamber (working chamber) R1 and the compression side chamber (working chamber) R2 provided in the shock absorber main body A; the main damping force generation element MD provided in the main passage MP; and the sub damping force generation element SD provided in the sub passage SP. The main damping force generation element MD has only the extension side main valve (main valve) 4 and the compression side main valve (main valve) 7 that open and close the main passage MP. The sub damping force generation element SD includes the orifice 2$f$ provided in series with the sub passage SP, and the sub valve 13 that opens and closes the sub passage SP and has a lower valve opening pressure than those of the extension side main valve (main valve) 4 and the compression side main valve (main valve) 7. In the shock absorber D configured as described above, the sub passage SP provided with the sub valve 13 and the main passage MP provided with the extension side main valve (main valve) 4 and the compression side main valve (main valve) 7 communicate in parallel the extension side chamber (working chamber) R1 and the compression side chamber (working chamber) R2. As a result, the extension side main valve (main valve) 4 and the compression side main valve (main valve) 7 are not affected by the flow passage area of the sub valve 13 becoming a bottleneck. Therefore, according to the shock absorber D of the present embodiment, a phenomenon, in which the characteristic of the sub valve 13 overrides the characteristics of the extension side main valve (main valve) 4 and the compression side main valve (main valve) 7 and the damping force becomes excessive, does not occur even when the expansion/contraction speed of the shock absorber D reaches the high speed range. As a result, ride quality in the vehicle can be improved.

In addition, in the shock absorber D of the present embodiment, the valve opening pressure of the sub valve 13 in the sub passage SP provided in parallel to the main passage MP is lower than the valve opening pressures of the extension side main valve (main valve) 4 and the compression side main valve (main valve) 7 in the main passage MP, and the orifice 2$f$ is provided only in the sub passage SP. As a result, the damping force characteristics, in the very low speed range, the low speed range, and the medium-to-high speed range, of the shock absorber D can be set by the characteristics of the corresponding sub valve 13, the orifice 2$f$, the extension side main valve (main valve) 4, and the compression side main valve (main valve) 7. Therefore, according to the shock absorber D of the present embodiment, the damping force characteristic can be finely set.

In addition, the shock absorber D of the present embodiment includes the piston (partition member) 3 that is inserted into the cylinder (outer tube) 1 and defines the extension side chamber (working chamber) R1 and the compression side chamber (working chamber) R2 in the cylinder (outer tube) 1. The main passage MP is formed of the extension side main port (main port) 3$c$ and the compression side main port (main port) 3$d$ that are provided in the piston (partition member) 3. The extension side main valve (main valve) 4 and the compression side main valve (main valve) 7 are formed into a leaf valve laminated on the piston (partition member) 3. According to the shock absorber D configured as described above, the main passage MP, the extension side main valve (main valve) 4, and the compression side main valve (main valve) 7 can be integrated in the piston (partition member) 3, and the total overall length of the piston (partition member) 3 and the extension side main valve (main valve) 4 and the compression side main valve (main valve) 7 that are assembled to the piston (partition member) 3 can be easily reduced by forming the extension side main valve (main valve) 4 and the compression side main valve (main valve) 7 into a leaf valve. As a result, the stroke length can be easily secured.

In addition, the shock absorber D of the present embodiment includes the rod (shaft member) 2 penetrating the piston (partition member) 3, and the sub passage SP has a portion passing through the rod (shaft member) 2. In a case where the two working chambers are the extension side chamber R1 and the compression side chamber R2 the shock absorber D configured as described above, a part of the sub passage SP bypassing the main passage MP is formed in the rod (shaft member) 2 while the main passage MP, the extension side main valve (main valve) 4, and the compression side main valve (main valve) 7 are integrated in the piston (partition member) 3. As a result, the sub passage SP can be easily installed.

Note that, for the extension side main valve 4 and the compression side main valve 7 as the main valve, and the sub valve 13, on-off type valves each capable of setting a valve opening pressure may be used in addition to the leaf valve.

Furthermore, the shock absorber D of the present embodiment includes the valve holder 12 that is attached to the tip of the rod (shaft member) 2 to fix the piston (partition member) 3 to the rod (shaft member) 2 and in which a part of the sub passage SP is formed, and the sub valve 13 is held by the valve holder 12. In the shock absorber D configured as described above, the sub valve 13 can be assembled in advance to the valve holder 12, and the valve holder 12 can also be used as a nut for fixing the piston (partition member) 3 to the rod (shaft member) 2. Therefore, according to the shock absorber D configured as described above, not only the sub valve 13 can be easily installed, but also the shock absorber D can be assembled very simply.

In the present embodiment, the sub valve 13 has a structure in which the inner circumference of the annular valve body 14 is fixed and the deflection on the outer circumferential side is allowed and the annular valve body faces the annular facing portion 15 on the outer circumference. However, the sub valve may have a structure in which the outer circumference of the annular valve body in the sub valve is fixed and the deflection on the inner circumferential side can be made and the annular valve seat is caused to face the inner circumference of the annular valve body.

In the shock absorber D of the present embodiment, the sub valve 13 includes the annular valve body 14 whose deflection is allowed in which one of the inner circumference or the outer circumference is fixed to serve as a fixed end and the other of the inner circumference or the outer circumference serves as a free end and that is provided in the sub passage SP, and the annular facing portion 15 facing the annular valve body 14 with the annular gap P interposed between the annular facing portion and the free end of the annular valve body 14. According to the shock absorber D configured as described above, the damping force can be exerted by narrowing the sub passage SP with the annular gap P in a state where the annular valve body 14 is not deflected, the damping force can be generated when the extension/contraction speed is in the very low speed range, and the opening area of the annular gap P can be adjusted by the size of the outer diameter of the annular valve body 14. As a result, the damping force characteristic can be easily adjusted by substituting the annular valve body 14 having a different outer diameter.

Figure 5:
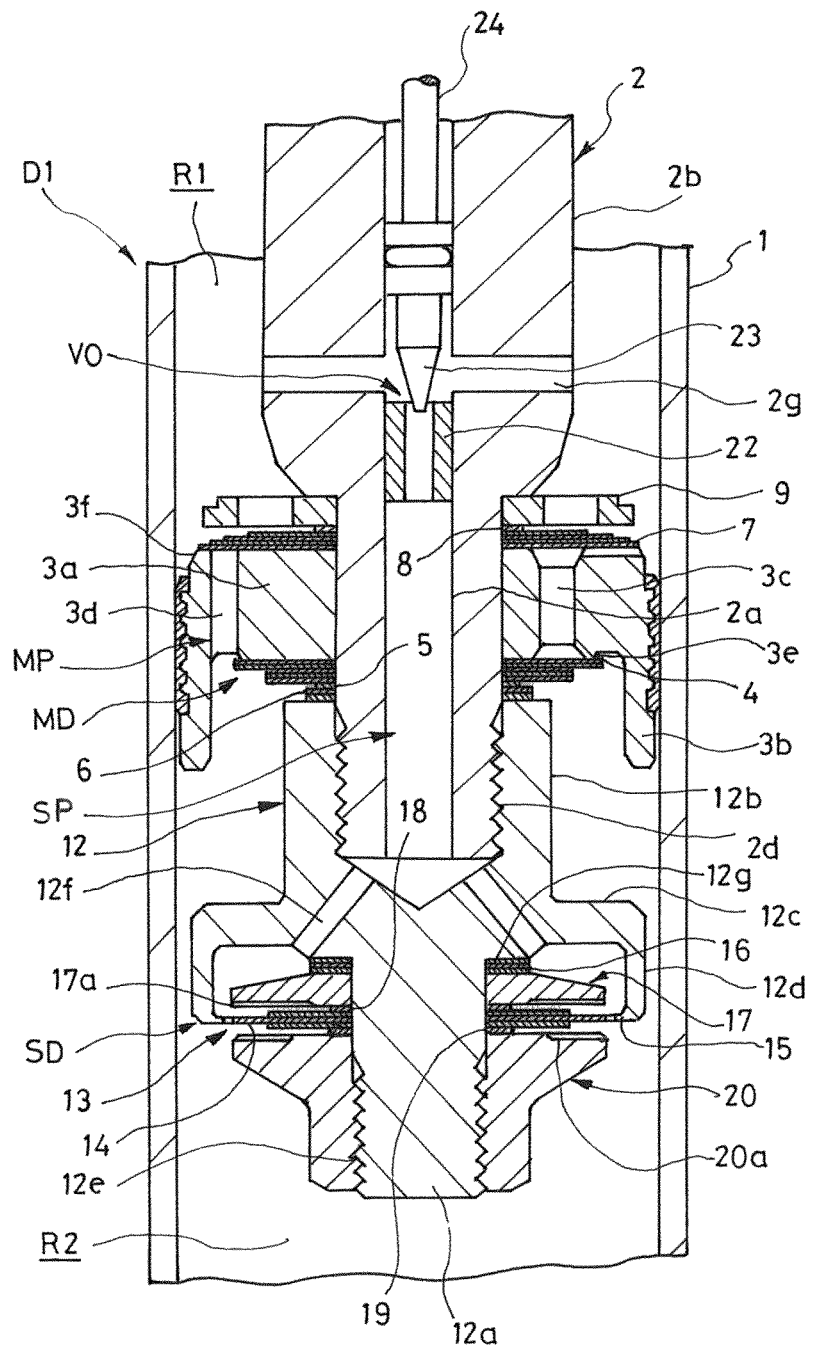
FIG. 5 is a partially enlarged cross-sectional view of a shock absorber according to a first modification of the one embodiment of the present invention.

Although the orifice 2f is a fixed orifice in FIG. 2, the orifice provided in the sub passage SP may be a variable orifice as in a shock absorber D1 of a first modification, illustrated in FIG. 5, of the one embodiment. Specifically, the shock absorber D1 may have a configuration modified as follows from the configuration of the shock absorber D, as illustrated in FIG. 5. The shock absorber D1 includes, instead of the orifice 2f, a lateral hole 2g communicating from the side of the large-diameter portion 2b of the rod 2 into the rod 2, and includes an annular valve seat member 22 inserted into and fixed to a portion in the rod 2, the portion being located lower, in FIG. 5, than the lateral hole 2g, and a needle 23 that is housed in the rod 2 and can move close to and away from the valve seat member 22. It is configured that with the needle 23 moving close to and away from the valve seat member 22, the flow passage area between the needle 23 and the valve seat member 22 can be changed, and the needle 23 and the valve seat member 22 form a variable orifice VO. In addition, the needle 23 is connected to a control rod 24 inserted into the rod 2 from the upper end of the rod 2, and by operating the control rod 24, the needle 23 moves close to and away from the valve seat member 22, thereby changing the axial distance with the valve seat member 22. The control rod 24 may be driven by a non-illustrated motor or linear actuator, or may be manually operated. The shock absorber D1 configured as described above can adjust the damping force characteristic of the shock absorber D1 and adjust a timing at which the characteristic of the variable orifice VO appears in the damping force characteristic by changing the flow passage area of the variable orifice VO.

Furthermore, in FIG. 1, the shaft member is the rod 2, the partition member is the piston 3, and the two working chambers are the extension side chamber R1 and the compression side chamber R2. However, as in a double tube type shock absorber D2 illustrated in FIG. 6, a valve case 30 that partitions a compression side chamber R4 and a reservoir R may be the partition member, the shaft member may be a guide rod 32 for fixing the main valve 31 to the valve case 30, and the two working chambers may be the compression side chamber R2 and the reservoir R.

Figure 6:
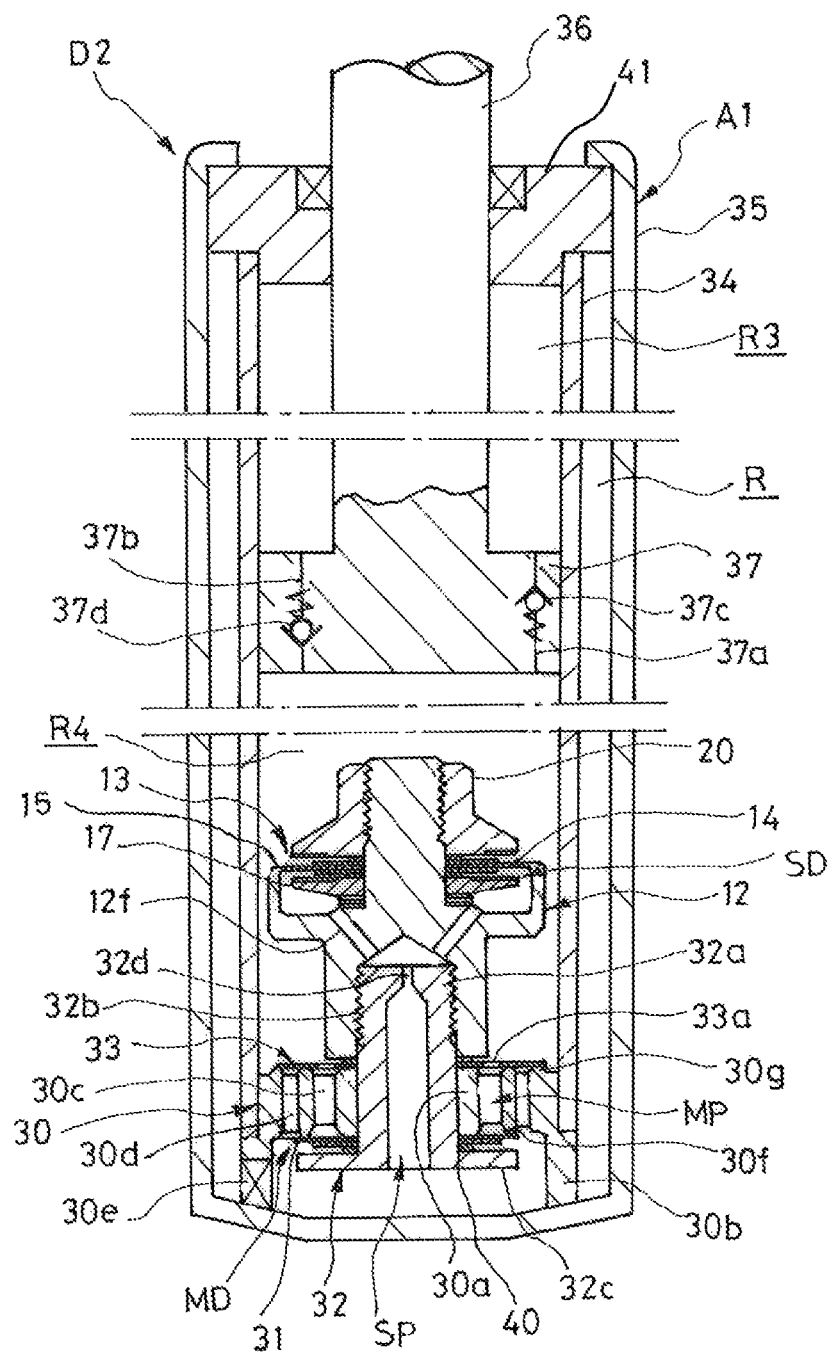
FIG. 6 is a partially enlarged cross-sectional view of a shock absorber according to a second modification of the one embodiment of the present invention.
Figure 7:
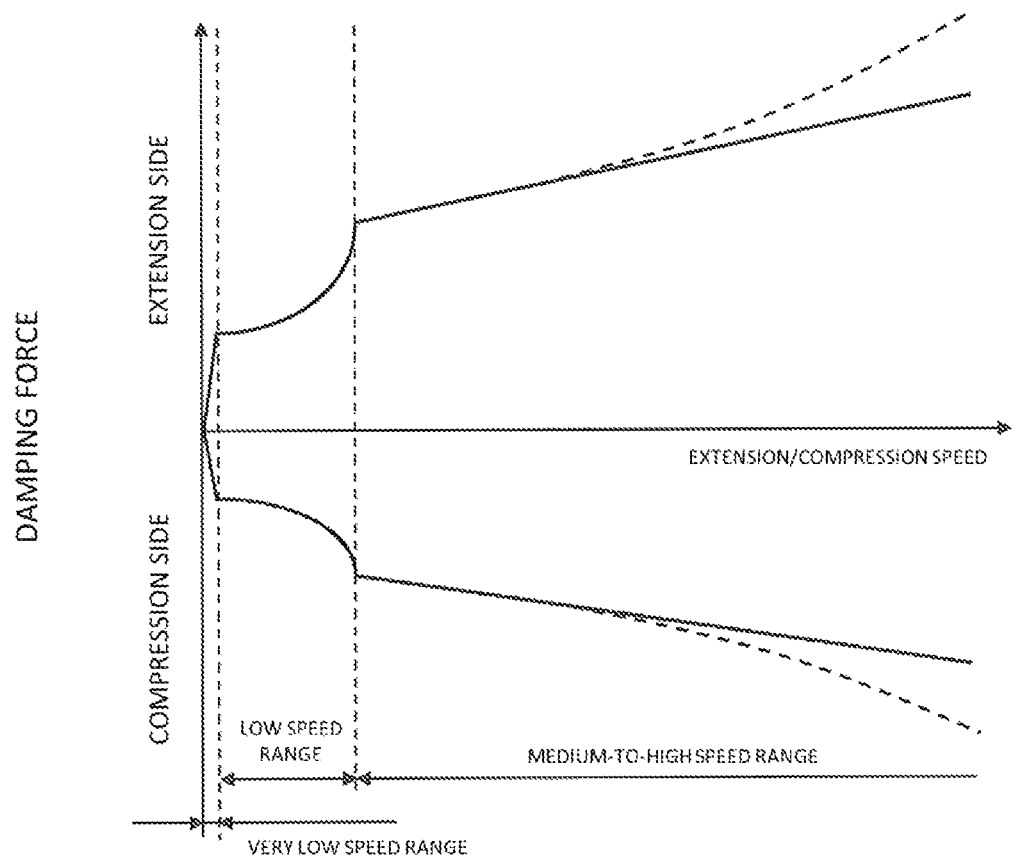
FIG. 7 is a graph showing a damping force characteristic of a conventional shock absorber.

The shock absorber D2 includes: a shock absorber main body A1 including a cylinder 34, a bottomed tubular outer tube 35 covering the outer circumference of the cylinder 34 and forming a reservoir R between the outer tube 35 and the cylinder 34, and a rod 36 movably inserted into the cylinder 34; a piston 37 connected to the rod 36, movably inserted into the cylinder 34, and partitioning the inside of the cylinder 34 into an extension side chamber R3 and the compression side chamber R4; the valve case 30 as the partition member that fits to the lower end, in FIG. 6, of the cylinder 34, is sandwiched between the lower end and the bottom portion of the outer tube 35, and defines the reservoir R and the compression side chamber R4 in the outer tube 35; a discharge port 30c as the main port provided in the valve case 30; a main valve 31 that opens and closes the discharge port 30c; and a guide rod 32 as the shaft member penetrating the valve case 30.

The upper ends of the cylinder 34 and the outer tube 35 are closed by a rod guide 41 having an annular shape and having an inner circumference through which the rod 36 is inserted, and the insides of the cylinder 34 and the outer tube 35 are sealed spaces.

The piston 37 includes: passages 37a and 37b that partition the inside of the cylinder 34 into the extension side chamber R3 and the compression side chamber R4, which are filled with liquid, and communicate the extension side chamber R3 and the compression side chamber R4; a damping valve 37c that is provided partway in the passage 37a, allows only the flow of the liquid moving from the extension side chamber R3 to the compression side chamber R4, and gives resistance to the flow of the liquid; and a damping valve 37d that is provided partway in the passage 37b, allows only the flow of the liquid moving from the compression side chamber R4 to the extension side chamber R3, and gives resistance to the flow of the liquid.

The valve case 30 is fitted to the lower end of the cylinder 34, and defines the compression side chamber R4 and the reservoir R formed between the cylinder 34 and the outer tube 35. In the shock absorber D2 of the present embodiment, the compression side chamber R4 and the reservoir R in the outer tube 35 are used as the working chambers, and the valve case 30 that partitions them is used as the partition member, as described above.

In detail, the valve case 30 includes: a main body portion 30a that has an annular shape and is fitted to the lower end, in FIG. 6, of the cylinder 34; an annular leg portion 30b extending downward from the outer circumference of the lower end of the main body portion 30a; the discharge port 30c as the main port that is provided on the same circumference of the main body portion 30a and penetrates the main body portion 30a in the axial direction; and a suction port 30d that is provided on the same circumference, on the outer circumferential side of the discharge port 30c, of the main body portion 30a and penetrates the main body portion 30a in the axial direction. In the present embodiment, the discharge port 30c provided in the valve case 30 forms the main port as the main passage MP that communicates the compression side chamber R4 as the working chamber and the reservoir R as the working chamber. In the valve case 30, the leg portion 30b is provided with a notch 30e that communicates the annular gap between the cylinder 34 and the outer tube 35 and the inside of the leg portion 30b, which does not interfere with the communication between the compression side chamber R4 and the reservoir R by the main port.

The guide rod 32 as the shaft member is inserted through the inner circumference of the valve case 30. The guide rod 32 includes a tubular shaft portion 32a inserted into the valve case 30, a screw portion 32b provided on the outer circumference of the tip of the shaft portion 32a, and a flange portion 32c provided on the outer circumference of the base end of the shaft portion 32a. An orifice 32d is provided partway in the shaft portion 32a.

The main valve 31 that is formed of an annular laminated leaf valve that opens and closes the discharge port 30c is overlapped on the lower end, in FIG. 6, of the valve case 30, and an annular check valve 33 that opens and closes the suction port 30d is overlapped on the upper end, in FIG. 6, of the valve case 30. The main valve 31, the valve case 30, and the check valve 33 are sequentially assembled to the outer circumference of the shaft portion 32a of the guide rod 32, and are fixed to the guide rod 32 by being sandwiched between the valve holder 12 screwed to the screw portion 32b and the flange portion 32c. The valve holder 12 is the same component as the valve holder in the shock absorber D, and holds the sub valve 13 and also plays the role of fixing the valve case 30 as the partition member to the guide rod 32 as the shaft member.

The main valve 31 is a laminated leaf valve formed by laminating a plurality of annular plates. The main valve 31 has an inner circumference fixed to the guide rod 32 as described above, is laminated on the lower end, in FIG. 6, of the valve case 30, is provided at the lower end, in FIG. 6, of the valve case 30, and is seated on a valve seat 30f surrounding the discharge port 30c. In the state of being seated on the valve seat 30f, the main valve 31 closes only the discharge port 30c surrounded by the valve seat 30f, and does not close the inlet of the suction port 30d. When the differential pressure between the pressure of the compression side chamber R4, acting on the front side via the discharge port 30c, and the reservoir R, acting on the back side, reaches the valve opening pressure, the main valve 31 deflects the outer circumference, separates from the valve seat 30f, opens the discharge port 30c, and gives resistance to the flow of the liquid passing through the discharge port 30c. In the shock absorber D2 of the present embodiment, the main valve 31 opens when the shock absorber D2 contracts and the piston speed is in the medium-to-high speed range, and gives resistance to the flow of the liquid passing through the discharge port 30c from the compression side chamber R4 to the reservoir R. In addition, the main valve 31 is set in a one-way passage that allows only the flow of the liquid flowing through the discharge port 30c from the compression side chamber R4 to the reservoir R. As described above, the main damping force generation element MD in the shock absorber D2 of the present embodiment is constituted by the main valve 31 provided in the discharge port 30c constituting the main passage MP, and does not include an orifice.

The setting of the valve opening pressure of the main valve 31 can be adjusted by the deflection stiffness of the main valve 31 and the initial deflection amount, similarly to the shock absorber D. The position of the fulcrum of the deflection can be adjusted by changing the outer diameter of a spacer 40 laminated on the back surface side of the main valve 31. In addition, a valve stopper for regulating the maximum deflection amount of the main valve 31 may be provided, or the flange portion 32c of the guide rod 32 may be used as the valve stopper for the main valve 31.

The check valve 33 is formed of an annular plate. The check valve 33 has an inner circumference fixed to the guide rod 32 as described above, is laminated on the upper surface, in FIG. 6, of the valve case 30, is provided at the upper end, in FIG. 6, of the valve case 30, and is seated on a valve seat 30g surrounding the suction port 30d. In the state of being seated on the valve seat 30g, the check valve 33 closes only the suction port 30d surrounded by the valve seat 30g. The check valve 33 includes a through hole 33a at a position facing the discharge port 30c, and does not close the discharge port 30c even in the state of being in contact with the upper surface, in FIG. 6, of the valve case 30. When the pressure of the compression side chamber R4 becomes lower than the pressure of the reservoir R, the check valve 33 is deflected and opens the suction port 30d, and allows the flow of the liquid moving from the reservoir R to the compression side chamber R4 via the suction port 30d. In this way, the check valve 33 is set in a one-way passage that allows only the flow of the liquid flowing though the suction port 30d from the reservoir R to the compression side chamber R4.

When the valve holder 12 is screwed to the guide rod 32 as described above, the shaft portion 32a faces the communication hole 12f of the valve holder 12, and the inside of the shaft portion 32a as communicated with the compression side chamber R4 through the communication hole 12f. In addition, the lower end, in FIG. 6, of the shaft portion 32a faces the reservoir R, so that the compression side chamber R4 and the reservoir R are communicated with each other through the inside of the annular portion 12d of the valve holder 12, the communication hole 12f, and the shaft portion 32a. Therefore, the shaft portion 32a and the valve holder 12 form the sub passage SP communicating, in parallel to the main passage MP, the compression side chamber R4 and the reservoir R.

The valve holder 12 and the sub valve 13 have the same configuration as in the shock absorber D. Therefore, the sub valve 13 includes the annular valve body 14 and the annular facing portion 15 provided in the valve holder 12. Then, in the state of being assembled to the outer circumference of the holding shaft 12a together with the spacer 16, the valve stopper 17, the spacer 18, and the spacer 19, the annular valve body 14 is sandwiched by the nut 20 screwed to the screw portion 12e and the inner circumferential seat portion 12g formed at the root of the flange portion 12c, and is fixed to the valve holder 12. Therefore, even in the shock absorber D2, the compression side chamber R4 and the reservoir R, which are the two working chambers, are communicated with each other by the main passage MP and the sub passage SP that are disposed in parallel. The main valve 31 is provided in the discharge port 30c that is the main port forming the main passage MP, and the orifice 32d and the sub valve 13, as the sub damping force generation element SD, are provided in series in the sub passage SP. The valve opening pressure of the main valve 31 is set to be larger than the valve opening pressure of the sub valve 13.

The opening area of the annular gap P in a state where the annular valve body 14 is not deflected is smaller than the opening area of the orifice 32d described above. When the shock absorber D2 contracts and the piston speed is in the low speed range or the medium-to-high speed range, the annular valve body 14 is deflected and the opening area of the annular gap P becomes larger than that of the orifice 32d. The valve opening pressure of the sub valve 13 is lower than the valve opening pressure of the main valve 31. When the piston speed during the contraction of the shock absorber D2 is in the low speed range, the sub valve 13 opens as described above, but the main valve 31 does not open, so that the liquid passes only through the sub passage SP.

When the shock absorber D2 configured as described above extends, the piston 37 moves upward in the cylinder 34 to compress the extension side chamber R3. The liquid moves from the compressed extension side chamber R3 to the expanding compression side chamber R4 through the passage 37a and the damping valve 37c of the piston 37. The exit of the rod 36 from the cylinder 34 makes the liquid short in the cylinder 34 by the volume of the rod 36 that has exited from the cylinder 34, but the shortage of the liquid is supplied from the reservoir R to the compression side chamber R4 through the suction port 30d by opening the check valve 33. Therefore, when the shock absorber D2 extends, it generates a damping force That interferes with the extension by the damping valve 37c.

On the other hand, when the shock absorber D2 contracts, the piston 37 moves downward in the cylinder 34 to compress the compression side chamber R4. The liquid moves from the compressed compression side chamber R4 to the expanding extension side chamber R3 through the passage 37b and the damping valve 37d of the piston 37. When the shock absorber D2 contracts, the rod 36 enters the cylinder 34, so that the liquid corresponding to the volume of the rod 36 that has entered the cylinder 34 becomes excessive in the cylinder 34. As a result, the excessive liquid moves to the reservoir R via the main passage MP or the sub passage SP. When the contraction speed of the shock absorber D2 is in the very low speed range, the pressure of the compression side chamber R4 rises, but the differential pressure with the pressure of the reservoir R does not reach the valve opening pressure of the main valve 31. As a result, the liquid cannot pass through the main passage MP. On the other hand, when the contraction speed of the shock absorber D2 is in the very low speed range, the pressure of the compression side chamber R4 rises, but the differential pressure with the pressure of the reservoir R does not reach the valve opening pressure of the sub valve 13. As a result, the sub valve 13 is also in a valve closed state, but the liquid can pass through the annular gap P in the sub valve 13. Therefore, the liquid cannot pass through the main passage MP that is blocked, but the liquid moves from the compression side chamber R4 to the reservoir R via the sub passage SP. When passing through the sub passage SP, the liquid passes through the orifice 32d and the annular gap P, but the flow passage area of the annular gap P in the sub valve 13 in a valve closed state is smaller than the flow passage area of the orifice 32d. In addition, the liquid, passing through the damping valve 37d and moving from the compression side chamber R4 to the extension side chamber R3, receives resistance from the damping valve 37d, so that the pressure of the compression side chamber R4 is higher than the pressure of the extension side chamber R3. Therefore, when the contraction speed of the shock absorber D2 is in the very low speed range, the shock absorber D2 generates a damping force mainly by the resistance given to the liquid by the sub valve 13 and the damping valve 37d. Therefore, when the contraction speed of the shock absorber D2 is in the very low speed range, the damping force characteristic on the compression side of the shock absorber D2 is a characteristic in which the damping coefficient is very large and greatly rises with respect to an increase in the piston speed.

When the contraction speed of the shock absorber D2 is in the low speed range beyond the very low speed range, the pressure of the compression side chamber R4 rises, but the differential pressure with the pressure of the reservoir R does not reach the valve opening pressure of the main valve 31. As a result, the main valve 31 is yet to open, and the discharge port 30c is kept closed. When the contraction speed of the shock absorber D2 is in the low speed range, the differential pressure between the pressure of the compression side chamber R4 and the pressure of the reservoir R exceeds the valve opening pressure of the sub valve 13. As a result, the annular valve body 14 is deflected and the sub valve 13 opens, which increases the flow passage area of the annular gap P between the annular valve body 14 and the annular facing portion 15. Therefore, the liquid cannot pass through the main passage MP that is blocked, but the liquid moves from the compression side chamber R2 to the extension side chamber R1 via the sub passage SP. When passing through the sub passage SP, the liquid passes through the orifice 32d and the annular gap P, but the flow passage area of the annular gap P in the sub valve 13 in a valve opened state is larger than the flow passage area of the orifice 32d. In addition, the liquid, passing through the damping valve 37d and moving from the compression side chamber R4 to the extension side chamber R3, receives resistance from the damping valve 37d, so that the pressure of the compression side chamber R4 is higher than the pressure of the extension side chamber R3. Therefore, when the contraction speed of the shock absorber D2 is in the low speed range, the shock absorber D2 generates a damping force mainly by the resistance given to the liquid by the orifice 32*d* and the damping valve 37*d*. Therefore, when the contraction speed of the shock absorber D2 is in the low speed range, the damping force characteristic on the compression side of the shock absorber D2 is proportional to the square of the contraction speed of the shock absorber D2, which is specific to an orifice. In the characteristic, the slope is flatter than when the contraction speed is in the very low speed range.

Furthermore, when the contraction speed of the shock absorber D2 is in the medium-to-high speed range beyond the low speed range, the differential pressure between the pressure of the compression side chamber R4 and the pressure of the reservoir R reaches the valve opening pressure of the main valve 31. As a result, the main valve 31 is deflected and opens, which opens the discharge port 30*c*. When the contraction speed of the shock absorber D2 is in the medium-to-high speed range, the sub valve 13 also opens. Therefore, the liquid can pass through the sub passage SP, but the main passage MP is also opened. As a result, the liquid moves from the compression side chamber R2 to the extension side chamber R1 through the sub passage SP and the main passage MP. When the contraction speed of the shock absorber D2 is in the medium-to-high speed range, the flow rate of the liquid moving from the compression side chamber R4 to the reservoir R increases. Since the resistance received by the liquid, when passing through the orifice 32*d* and the sub valve 13 in the sub passage SP, is larger than the resistance received by the liquid, when passing through the compression side main valve 7, the liquid becomes difficult to pass through the sub passage SP. As a result, most of the liquid moving from the compression side chamber R4 to the reservoir R passes through the main passage MP. In addition, the liquid, passing through the damping valve 37*d* and moving from the compression side chamber R4 to the extension side chamber R3, receives resistance from the damping valve 37*d*, so that the pressure of the compression side chamber R4 is higher than the pressure of the extension side chamber R3. Therefore, when the extension speed of the shock absorber D2 is in the medium-to-high speed range, the shock absorber D2 generates a damping force mainly by the resistance given to the liquid by the main valve 31 and the damping valve 37*d*. Therefore, when the contraction speed of the shock absorber D2 is in the medium-to-high speed range, the damping force characteristics on the compression side of the shock absorber D2 is proportional to the compression speed of the shock absorber D2, which is specific to the main valve 31. In the characteristic, the damping coefficient is smaller than when the contraction speed is in the low speed range. The passage 37*b* may be provided with, instead of the damping valve 37*d*, a check valve that allows only the flow of the liquid moving from the compression side chamber R4 to the extension side chamber R3. Since the check valve gives little resistance to the flow of the liquid, it does not contribute to the damping force of the shock absorber D2. Therefore, when a check valve is provided instead of the damping valve 37*d*, the shock absorber D2 generates a damping force: mainly by the sub valve 13 when the contraction speed is in the very low speed range; mainly by the orifice 32*d* when the contraction speed is in the low speed range; and mainly by the main valve 31 when the contraction speed is in the medium-to-high speed range.

As described above, the shock absorber D2 of the present embodiment includes: the main passage MP and the sub passage SP that communicate in parallel the compression side chamber R4 and the reservoir R; the main damping force generation element MD provided in the main passage MP; and the sub damping force generation element SD provided in the sub passage SP. The main damping force generation element MD includes only the main valve 31 that opens and closes the main passage MP. The sub damping force generation element SD includes the orifice 32*d* provided in series with the sub passage SP and the sub valve 13 that opens and closes the sub passage SP and has a valve opening pressure lower than that of the main valve 31. In the shock absorber D2 configured as described above, the sub passage SP provided with the orifice 32*d* and the sub valve 13, and the main passage MP including only the main valve 31 as the main valve, communicate in parallel the compression side chamber R2 and the reservoir R. As a result, even if the deflection of the sub valve 13 is regulated by the valve stopper 17 or the nut 20, the flow of the liquid passing through the main passage MP is not affected. That is, in the shock absorber D2 of the present embodiment, the sub valve 13 does not become a bottleneck that limits the flow passage area to the minimum. Therefore, even when the contraction speed of the shock absorber D2 reaches the high speed range, most of the liquid in the compression side chamber R4 that is compressed by the piston 3 flows through the main passage MP. As a result, it is possible to suppress override in which the damping force is excessive because a pressure loss due to the sub valve 13 is added to a pressure loss in the main valve 31.

As described above, the main passage MP and the sub passage SP may communicate the extension side chamber R1 and the compression side chamber R2 in the outer tube 1 or 35, or may communicate the compression side chamber R4 and the reservoir R. In addition, it is also possible to adopt a configuration in which, instead of the rod 36 and the piston 37 of the shock absorber D2, the rod 2, the piston 3, the extension side main valve 4, the compression side main valve 7, the valve holder 12, and the sub valve 13 of the shock absorber D are applied, so that the main passage MP and the sub passage SP, and the main damping force generation element MD and the sub damping force generation element SD are respectively provided on the piston side and the valve case side. In addition, it may be configured as follows, in which the extension side chamber and the reservoir are used as the working chambers, the extension chamber and the reservoir are communicated in parallel by the main passage and the sub passage, the main damping force generation element is provided in the main passage, and the sub damping force generation element is provided in the sub passage.

In the above description, the sub valve 13 includes the annular valve body 14 and the annular facing portion 15 facing the annular valve body 14 with the annular gap P interposed therebetween. However, the sub valve may be, instead of this, a de-carbon valve that is not illustrated and includes an inner valve seat and an outer valve seat having different diameters, and an annular double opening leaf valve in which the inner circumferential side of one end surface is seated on the inner valve seat and the outer circumferential side of the other end surface is seated on the outer valve seat. When the de-carbon valve is used as the sub valve 13, as described above, the leaf valve deflects one of the inner circumference or the outer circumference to open the sub passage SP with respect to the flow of the liquid moving from the extension side chamber R1 (compression side chamber R4) to the compression side chamber R2 (reservoir R), while the leaf valve deflects the other of the inner circumference or the outer circumference to open the sub passage SP with respect to the flow of the liquid moving from the compression side chamber R2 (reservoir R) to the extension side chamber R1 (compression side chamber R4), thereby giving resistance to the flow of the liquid.

The preferred embodiments of the present invention have been described in detail above, but modifications, variations, and alterations can be made without departing from the scope of the claims.

Reference Signs List 1 cylinder (outer tube)
rod (shaft member)
2f, 32d orifice
3 piston (partition member)
3c extension side main port (main port)
3d compression side main port (main port)
4 extension side main valve (main valve)
7 compression side main valve (main valve)
12 valve holder
13 sub valve
14 annular valve body
15 annular facing portion
30 valve case (partition member)
31 main valve
32 guide rod (shaft member)
35 outer tube
A, A1 shock absorber main body
D, D1, D2 shock absorber
MD main damping force generation element
MP main passage
R1 extension side chamber (working chamber)
R2 compression side chamber (working chamber)
R4 SD sub damping force generation element
SP sub passage
VO variable orifice

The invention claimed is:

1. A shock absorber comprising:
a shock absorber main body that has an outer tube and a rod movably inserted into the outer tube and can extend and contract;
a partition member that is inserted into the outer tube and defines two working chambers in the outer tube;
a shaft member penetrating the partition member;
a main passage and a sub passage that communicate in parallel the two working chambers provided in the shock absorber main body;
a valve holder that is attached to a tip of the shaft member to fix the partition member to the shaft member and in which a part of the sub passage is formed;
a main damping force generation element provided in the main passage; and
a sub damping force generation element provided in the sub passage, wherein
the main damping force generation element has only a main valve that opens and closes the main passage,
the sub damping force generation element has an orifice provided in series with the sub passage and a sub valve that is held by the valve holder, opens and closes the sub passage, and has a valve opening pressure lower than a valve opening pressure of the main valve,
the main passage is formed of a main port provided in the partition member,
the main valve is a leaf valve laminated on the partition member,
the sub passage has a portion passing through the shaft member the sub valve has an annular valve body whose deflection is allowed in which an inner circumference of the annular valve body is fixed to the valve holder to serve as a fixed end and an outer circumference of the annular valve body can move in a vertical direction to serve as a free end and that is provided in the sub passage, and an annular facing portion facing the annular valve body with an annular gap interposed between the annular facing portion and the free end of the annular valve body, and
a damping force is generated by the sub valve when a expansion/contraction speed is in a very low speed range, by the orifice when the expansion/contraction speed is in a low speed range higher than the very low speed range, and by the main valve when the expansion/contraction speed is in a medium-to-high speed range higher than the low speed range.

2. The shock absorber according to claim 1, wherein the orifice is a fixed orifice.

3. A shock absorber comprising:
a shock absorber main body that has an outer tube and a rod movably inserted into the outer tube and can extend and contract;
a main passage and a sub passage that communicate in parallel two working chambers provided in the shock absorber main body;
a main damping force generation element provided in the main passage; and
a sub damping force generation element provided in the sub passage, wherein
the main damping force generation element has only a main valve that opens and closes the main passage,
the sub damping force generation element has an orifice provided in series with the sub passage and a sub valve that opens and closes the sub passage and has a valve opening pressure lower than a valve opening pressure of the main valve,
the orifice is a variable orifice, and
a damping force is generated by the sub valve when a expansion/contraction speed is in a very low speed range, by the orifice when the expansion/contraction speed is in a low speed range higher than the very low speed range, and by the main valve when the expansion/contraction speed is in a medium-to-high speed range higher than the low speed range.

4. The shock absorber according to claim 1, wherein an opening area of the annular gap between the annular valve body and the annular facing portion is smaller than an opening area of the orifice.

5. The shock absorber according to claim 1, wherein the main valve is a laminated leaf valve that is annular and allowed to deflect an outer circumference,
the sub valve has an annular valve body that is annular and allowed to deflect an outer circumference, and
a fulcrum of deflection of the sub valve is provided on an inner circumference in a radial direction than a fulcrum of deflection of the main valve.

6. The shock absorber according to claim 3, wherein the main valve is a laminated leaf valve that is annular and allowed to deflect an outer circumference,
the sub valve has an annular valve body that is annular and allowed to deflect an outer circumference, and
a fulcrum of deflection of the sub valve is provided on an inner circumference in a radial direction than a fulcrum of deflection of the main valve.

* * * * *